UNITED STATES PATENT OFFICE.

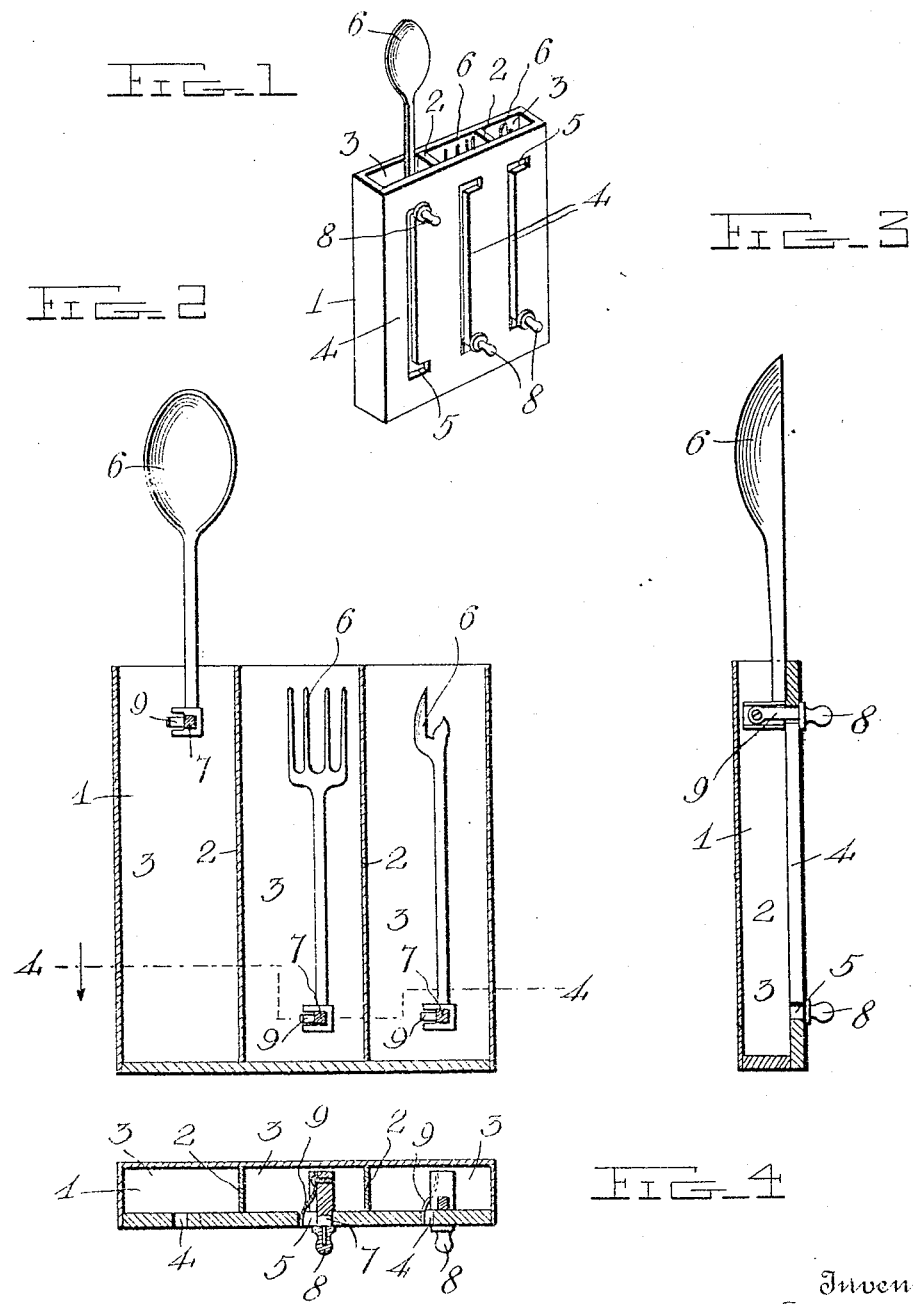

CLAUD MASSEY, OF BOSTON, GEORGIA.

COMBINATION CAMPING OUTFIT.

No. 844,603. Specification of Letters Patent. Patented Feb. 19, 1907.

Application filed May 7, 1906. Serial No. 315,617.

*To all whom it may concern:*

Be it known that I, CLAUD MASSEY, a citizen of the United States, residing at Boston, in the county of Thomas and State of Georgia, have invented certain new and useful Improvements in Combination Camping Outfits; and I do declare the following to be a full, clear, and exact description of the invention, such as will enable others skilled in the art to which it appertains to make and use the same.

This invention relates to improvements in combination camping outfits.

The object of the invention is to provide a device of this character comprising a combined handle and case in which is arranged a series of implements which are adapted to be drawn out of the case and secured in a position for use and which after use may be pushed back into the casing and secured therein, thus providing a handle and also means for holding and carrying the implements, the case being readily carried in any of the pockets of a garment and the implements securely protected thereby.

With the above and other objects in view the invention consists of certain novel features of construction, combination, and arrangement of parts, as will be hereinafter described and claimed.

In the accompanying drawings, Figure 1 is a perspective view of the invention, showing one of the implements projected in position for use. Fig. 2 is a vertical longitudinal sectional view of the same. Fig. 3 is a similar view taken at right angles to Fig. 1, and Fig. 4 is a horizontal sectional view of the same.

Referring more particularly to the drawings, 1 denotes a casing, which may be of any suitable shape, but which is here shown and is preferably of a flat rectangular form, said casing being divided by partitions 2 into a series of compartments 3, of which there may be any desired number, three of said compartments being shown in the present instance. In one of the side walls of the casing 1 is formed a series of longitudinally-disposed slots 4, said slots being preferably arranged in the center of each compartment. At the opposite ends of the slots 4 are formed short offset slots 5.

Arranged in each of the compartments 3 is a culinary implement 6, said implements being shown in the present instance as a spoon, fork, and can-opener. Any other desired implements may, however, be substituted for those here shown. On the inner ends of the stem or shank of the implements 6 is formed a right-angularly-projecting lug 7, adapted to project through and slide in the slots 4. On the outer ends of each lug 7 is secured a knob 8, by means of which the implements are held in engagement with the slots and moved in and out of the casing, as will be understood. When the implements are in a closed position or drawn into the casing, the lug 7 is engaged with the offset slot 5 at the inner end of the slots 4, thus preventing the slipping out of the implement when the same is not in use. When the implements are drawn out of the casing for use, the lugs 7 are adapted to be engaged with the offsets 5 at the outer ends of the slots 4, thereby holding the implements in a projected position for use. In order that the lugs 7 on the shanks of the implements may be held in engagement with the offset slots 5, a suitable spring 9 is secured to the shanks and is adapted to bear against one wall of the slots 4 in such a position that when the implement has been drawn out of the casing to a position for use the lug 7 on the handle thereof will spring into the offset slot 5, thus holding the lug in engagement with the slot, and in the same manner when the implement is pushed into the casing the spring 9 will force the lug 7 into the offset slot at the inner end of the longitudinal slots 4, and thereby hold the implements in the casing.

By providing an outfit of this character a plurality of culinary implements may be conveniently carried in the pocket when not in use and quickly projected for use from the casing containing the same, said casing when the implements are thus projected serving as a handle for the implements.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claim.

Having thus described my invention, what I claim as new, and desire to secure by Letters Patent, is—

A combination camping outfit, comprising a flat rectangular casing open at one end and divided longitudinally into a plurality of implement-containing compartments, each compartment having in one wall thereof a longitudinally-extending slot with lateral extensions at each end thereof, a culinary implement disposed in each compartment and having a projecting lug on its shank adapted to extend through said slot, and a spring carried by said lug for engaging the walls of the lateral slots to hold said implement in extended or withdrawn position.

In testimony whereof I have hereunto set my hand in presence of two subscribing witnesses.

CLAUD MASSEY.

Witnesses:
J. A. HORN,
F. C. JONES.